United States Patent [19]

Jacobs et al.

[11] Patent Number: 5,278,197

[45] Date of Patent: Jan. 11, 1994

[54] SOFT, FLEXIBLE POLYURETHANE FOAM

[75] Inventors: Gundolf Jacobs, Pittsburgh; Bin Lee, Coraopolis, both of Pa.

[73] Assignee: Miles Inc., Pittsburgh, Pa.

[21] Appl. No.: 87,954

[22] Filed: Jul. 6, 1993

[51] Int. Cl.$^5$ .............................. C08J 9/12; C08J 9/14
[52] U.S. Cl. ..................................... 521/121; 521/155; 521/157; 521/170; 521/189
[58] Field of Search ............... 521/121, 155, 157, 170, 521/189

[56] References Cited

U.S. PATENT DOCUMENTS

| | | | |
|---|---|---|---|
| 3,067,148 | 12/1962 | Sandridge et al. | 360/2.5 |
| 4,048,221 | 9/1977 | Wolf et al. | 260/512 C |
| 4,056,564 | 11/1977 | Wolf et al. | 260/512 C |
| 4,569,952 | 2/1986 | Radovich et al. | 521/167 |
| 4,876,292 | 10/1989 | Milliren | 521/159 |
| 4,950,694 | 8/1990 | Hager | 521/167 |
| 4,970,243 | 11/1990 | Jacobs et al. | 521/155 |

FOREIGN PATENT DOCUMENTS

| | | |
|---|---|---|
| 429103 | 11/1989 | European Pat. Off. . |
| 358282 | 3/1990 | European Pat. Off. . |
| 1154093 | 9/1963 | Fed. Rep. of Germany . |

*Primary Examiner*—Morton Foelak
*Attorney, Agent, or Firm*—Joseph C. Gil; Aron Preis

[57] ABSTRACT

A soft, flexible foam characterized in having (i) a hardness, IFD 25% value, of at most 29 lbs/50 in$^2$, as determined in accordance with Test B$_1$ of ASTM D 3574 and (ii) a density of about 0.9 to 3.0. pounds per cubic foot is disclosed. Accordingly, the foam is prepared by reacting an organic polyisocyanate with a polyol in the presence of a catalyst and water and a compound conforming to

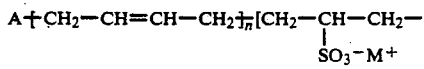

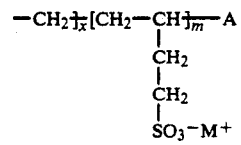

where A is selected from among H, COOH, NH$_2$, and OH, M is a counter ion, and where n, x and m are selected such that said compound has a number average molecular weight of about 500 to 20,000, a functionality of 0 to 10 and a sulfonate concentration of about 0.1 to 30 percent by weight.

5 Claims, No Drawings

SOFT, FLEXIBLE POLYURETHANE FOAM

FIELD OF THE INVENTION

The invention relates to soft, flexible polyurethane foams and to a process for their preparation.

BACKGROUND OF THE INVENTION

Flexible polyurethane foams are generally prepared by reacting an organic polyisocyanate and a polyol in the presence of a blowing agent, a catalyst and optional auxiliary additives. The blowing agents used in this application were halogenated hydrocarbons, such as freon. In recent years due to environmental considerations, there has been a trend away from the use of halogenated hydrocarbons.

Among the large number of patents which deal with flexible polyurethane foams note might be made of U.S. Pat. No. 3,067,148 which disclosed a process for the preparation of cellular polyurethane entailing reacting water, an organic isocyanate and a mixture of trihydric polyalkylene ether with a specific tetrahydric organic compound. Also relevant is U.S. Pat. No. 4,569,952 which disclosed a certain addition product of an alkylerne oxide and an aromatic amine which additive is said to contribute to the load bearing properties of soft, flexible polyurethane foams. An amine containing reactive mixture useful in the preparation of flexible polyurethane foam has been disclosed in U.S. Pat. No. 4,876,292. Also relevant in this connection are U.S. Pat. Nos. 4,950,694 and 4,970,243 as well as European Patent Applications 358,282 and 429,103 all of which disclosed processes for the preparation of water-blown polyurethane foam.

Also presently relevant is U.S. Pat. No. 4,048,221 which disclosed dihydroxy sulphonate containing ether groups and a process for their preparation. The sulphonates are said to be suitable as monomers for the preparation of acid-modified polyurethanes. Also relevant is U.S. Pat. No. 4,056,564 which disclosed dihydroxy sulphonates containing ether groups.

SUMMARY OF THE INVENTION

A soft, flexible polyurethane foam which may be prepared with no resort to halogenated hydrocarbons is disclosed. Foaming in accordance with the invention is preferably obtained by the use of water, although other conventional blowing agents may be used. Accordingly, a sulfonated polybutadiene was found to be an effective foam-softening agent. The compound conforms generally to

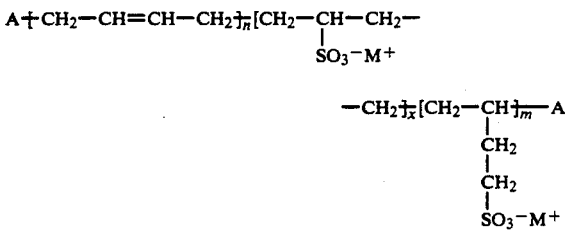

wherein A is an end-group selected from among H, COOH, $NH_2$, and OH and M are counter-ions. The subscripts n, x and m are selected such that the compound has a number average molecular weight of about 500 to 20,000, a functionality of 0 to 10 and a sulfonate concentration of about 0.1 to 30 percent by weight.

DETAILED DESCRIPTION OF THE INVENTION

The soft, flexible foam of the invention is characterized by (i) having a hardness, IFD 25% value, of at most 29 lbs/50 in$^2$, as determined in accordance with Test $B_1$ of ASTM D 3574 and (ii) a density of about 0.9 to 3.0, preferably 1.2 to 2.5, pounds per cubic foot.

In producing the soft, flexible foams herein, substantially any organic compound containing more than two hydroxyl groups can be used as the polyol component. Such compounds generally have molecular weights of from about 400 to about 12,000, preferably from about 1,000 to about 8,000, and most preferably from about 1,500 to about 7,000. The functionality of the hydroxyl group containing compound is generally in excess of 2 and preferably has an average functionality of from 2.5 to no more than 4. Preferred compounds include polyesters, polyethers, polythioethers, polyacetals, polycarbonates and polyester amides containing an average of more than 2, and preferably from 2.5 to 4 hydroxyl groups.

Polyesters containing hydroxyl groups suitable for the present invention are reacting products of polyhydric alcohols with polybasic carboxylic acids. Instead of using the free polycarboxylic acids, it is also possible to use the corresponding polycarboxylic acid anhydrides or corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example, by halogen atoms) and/or may be unsaturated.

Examples of suitable carboxylic acids and derivatives thereof are succinic acid, adipic acid, suberic acid, azelaic acid, sebacic acid, phthalic acid, isophthalic acid, trimelitic acid, phthalic acid anhydride, tetrahydrophthalic acid anhydride, hexahydrophthalic acid anhydride, tetrahydrophthalic acid anhydride, glutaric acid anhydride, maleic acid, maleic acid anhydride, fumaric acid, dimerized and trimerized unsaturated fatty acids (optionally, in admixture with monomeric unsaturated fatty acids, such as oleic acid) terephthalic acid dimethylester and terephthalic acid-bis-glycol ester. Suitable polyhydric alcohols include: ethylene glycol, 1,2-and 1,3-propylene glycol, 1,4- and 2,3-butylene glycol, 1,6-hexane diol, 1,8-octane diol, neopentyl glycol, 1,4-bis-hydroxymethyl-cyclohexane, 2-methyl-1,3-propane diol, glycerol, trimethylol propane, 1,2,6-hexane triol, 1,2,4-butane triol, trimethylol ethane, pentarerythritol, quinitol, mannitol, sorbitol, formitol, methyl glycoside, diethylene glycol, triethylene glycol, tetraethylene glycol and higher polyetheylene glycols, dipropylene glycol and higher polypropylene glycols, dibutylene glycol and higher polybutylene glycols. The polyesters may contain terminal carboxyl groups. Polyesters of lactones (for example, ε-caprolactone) or of hydroxy carboxylic acids (for example, ω-hydroxy caproic acid) may also be used.

The polyesters suitable for use in accordance with the present invention are known to those in the art. These polyesters may be obtained by polymerizing epoxides, such as ethylene oxide, propylene oxide, butylene oxide, tetrahydrofuran, styrene oxide, or epichlorohydrin in the presence of Lewis catalysts, such as BF3. Polymerization may also be accomplished by the addition of epoxides (preferably, ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyesters of the type described in German Auslegeschriften Nos. 1,176,358 and 1,064,938 and formitol or formose-started polyesters (German Offenlegugsschriften Nos. 2,639,083 and 2,737,951) may also be used in accordance with the present invention.

Among the polythioethers which may be employed as the high molecular weight isocyanate reactive compounds, the condensation products of thiodiglycol on its own and/or with other glycols, dicarboxylic acids, formaldehyde, aminocarboxylic acids or amino alcohols are preferred. These condensation products include polythio mixed ethers, polythioether esters or polythioether ester amides.

Polyacetals which may be used in the present invention include the compounds obtained by reacting glycols (such as, diethylene glycol, triethylene glycol, 4,4'-dioxethoxy diphenyl dimethyl methane and hexane diol) with formaldehyde. Other polyacetals suitable to the present invention may be obtained by polymerizing cyclic acetals, such as trioxane (German Offenlegungsschrift No. 1,694,128).

Suitable polycarbonates containing hydroxyl groups are known to those in the art. Such polycarbonates may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example, diphenyl carbonate) or with phosgene (see in this connection German Auslegeschriften Nos. 1,694,080; 1,915,908 and 2,221,751; German Offenlegungsscrhift No. 2,605,024).

The polyester amides and polyamides suitable to the present invention include the predominantly linear condensates obtained from polybasic carboxylic acids or anhydrides thereof and polyhydric amino alcohols, diamines, higher polyamines and mixtures thereof.

Polyhydroxyl compounds containing urethane or urea groups, optionally modified natural polyols (such as castor oil), and carbohydrates (for example, starch), may also be used as the isocyanate reactive compound of the present invention. Additional products of alkylene oxides with phenol/formaldehyde resins or with urea/formaldehyde resins may also be used.

The above-mentioned polyhydroxyl compounds may be modified in various ways. One such modification (described in German Offenlegungsschriften Nos. 2,210,839 (U.S. Pat. No. 3,849,515) and 2,544,195) is accomplished by etherification of a mixture of different polyhydroxyl compounds (for example, polyether polyol and a polyester polyol) in the presence of a strong acid to form a relatively high molecular weight polyol which is made up of different segments attached through ether and ester bridges. Amide groups may be introduced into the polyhydroxyl compounds by the procedure disclosed in German Offenlegungsschrift No. 2,559,372. Triazine groups may be introduced in the polyhydroxyl compounds by reacting the polyhydroxyl compounds with polyfunctional cyanic acid esters (German Offenlegungsschrift No. 2,620,487). The reaction of a polyol with a less than equivalent quantity of a diisocyanato-carbodiimide, followed by reaction of the carbodiimide group with an amine, amide, phosphite or carboxylic acid, gives polyhydroxyl compounds containing guanidine, phosphonoformamide or acyl urea groups (German Offenlegungsschriften Nos. 2,714,289; 2,714,292 and 2,714,293).

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and aminofunctional compounds), and polycondensation reactions (for example, between formaldehyde and phenols and/or amines) in situ in the above-mentioned compounds containing hydroxyl groups. Such processes are described in german Auslegeschriften Nos. 1,168,075; 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible to obtain such a polyhydroxyl compound by mixing an aqueous polymer dispersion with a polyhydroxyl compound and subsequently removing the water from the mixture (U.S. Pat. No. 3,869,413 or German Offenlegungsschrift No. 2,550,860).

In one additional embodiment of the present invention, the polyol is a dispersion of a polyurea and/or polyhydrazodicarbonamide in an organic compound containing at least two hydroxyl groups. These dispersions are known in the art, are commercially available, and have been described, e.g. in U.S. Pat. Nos. 3,325,421; 4,042,537; 4,089,835; 4,293,470; 4,296,213 and 4,374,209, the disclosures of which are herein incorporated by reference. In general, the dispersions useful herein are by reference. In general, the dispersions useful herein are functional isocyanates with (a) polyamines containing primary and/or secondary amino groups and/or (b) hydrazines and/or hydrazides, in the presence of an organic compound which contains at least two hydroxyl groups. As is known and as described in the above-noted U.S. patents, such dispersions can be produced having a wide range of solids contents. In general, the solids content of the dispersion itself will range from 1 to as high as 40 percent, and preferably from 5 to 40 percent by weight. In general it is preferred that such dispersions contain high levels of primary hydroxyl groups.

Also suitable are the so-called polymer polyols which are prepared by polymerizing one or more ethylenically unsaturated monomers in a relatively high molecular weight organic compound containing at least two hydroxyl groups (U.S. Pat. Nos. 3,383,351; 3,304,273; 3,523,093 and 3,110,695; German Auslegeschrift No. 1,152,536) or polycarbonate polyols (German Patent No. 1,769,795; U.S. Pat. No. 3,637,909) are also suitable for use in the process according to the present invention. Plastics having particularly low combustibility are obtained by using polyether polyols modified by graft polymerization with vinyl phosphonic acid esters and, optionally, (meth-)acrylonitrile, (meth-)acrylamide or OH-functional (meth-)acrylic acid esters (Grman Offenlegungsschriften Nos. 2,442,101; 2,644,922 and 2,646,141). Polyhydroxyl compounds into which carboxyl groups have been introduced by radical graft to polymerization with unsaturated carboxylic acids and, optionally, other olefinically unsaturated monomers (German Offenlegungsschriften Nos. 2,714,291;

2,739,620 and 2,654,746) are particularly advantageous when used in combination with mineral fillers.

The polymer polyols noted above and useful herein are known and are commercially available. Typical preparations of such polyols are disclosed in U.S. Pat. Nos. Re. 28,715 and 29,118, the disclosures of which are herein incorporated by reference. Polymer polyols are available commercially from such companies as Miles Inc., Bayer AG, Union Carbide and BASF.

Representatives of the above-mentioned polyols suitable to the present invention are described in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example, on pages 45 to 71. It is, of course, possible to use mixtures of the above-mentioned compounds.

Substantially any organic polyisocyanate may be used in producing the flexible foams of the present invention. Aliphatic, cycloaliphatic, araliphatic, aromatic and heterocyclic polyisocyanates may be used. Examples of suitable polyisocyanates are described by W. Siefken in Justus Liebigs Annalen der Chemie, 562, pages 75 to 136. Among the polyisocyanates described herein are those corresponding to the general formula $$Q(NCO)_n$$

wherein n represents 2–4, preferably 2; and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 15 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanato-methyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro 2,4'-and/or 4,4'-dipheynl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are: triphenyl methane-4,4',4"-triisocyanate, polyphenyl polymethylene polyisocyanates of the type obtained by condensing aniline with formaldehyde followed by phosgenation (described in British Pat. Nos. 874,430 and 848,671); m- and p-isocyanatophenyl sulfonyl isocyanates (U.S. Pat. No. 3,277,138); polyisocyanates containing carbodiimide groups (German Pat. No. 1,092,007 (U.S. Pat. No. 3,152,162) and German Offenlegungsschriften Nos. 2,504,400; 2,537,685 and 2,552,350)); norbornane diisocyanates (U.S. Pat. No. 3,492,330); polyisocyanates containing allophanate groups (British Pat. No. 994,890, Belgian Pat. No. 761,626 and Dutch Patent Application No. 7,102,524); polyisocyanates containing isocyanurate groups (U.S. Pat. No. 3,001,973); German Pat. Nos. 1,022,789; 1,222,067 and 1,027,394 and German Offenlegungsschriften Nos. 1,929,034 and 2,001,048); polyisocyanates containing urethane groups (Belgian Pat. No. 752,261, U.S. Pat. Nos. 3,394,164 and 3,644,457); polyisocyanates containing acylated urea groups (German Pat. No. 1,230,778); polyisocyanates containing biuret groups (U.S. Pat. Nos. 3,124,605 and 3,201,373, British Pat. No. 889,050); polyisocyanates produced by telomerization reactions (U.S. Pat. No. 3,654,106); polyisocyanates containing ester groups (British Pat. Nos. 965,474 and 1,072,956, U.S. Pat. Nos. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883). It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially available polyisocyanates be used in the present invention. Such readily available materials include 2,4- and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

Preferred polyisocyanates for use in accordance with the invention include tolylene diisocyanate in the form of an 80:20 mixture of the 2,4- and 2,6-isomers ("TDI 80"), tolylene diisocyanate in the form of 65:35 mixture of the 2,4- and 2,6-isomers (TDI 65"), and tolylene diisocyanate prepolymers.

The sulfonated polybutadiene polyol useful in the present invention contains cis and trans 1,4 and 1,2 vinyl isomeric structure and conforms generally to

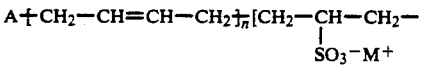

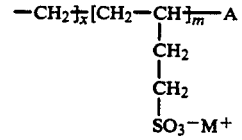

where A is an end-group selected from among H, COOH, NH$_2$, and OH; M is a counter ion selected from the group consisting of H$^+$, LI$^+$, Na$^+$, K$^+$ and NR$_4^+$, where R is hydrogen or an alkyl group. n, x and m are selected such that the sulfonated polybutadiene polyol has a number average molecular weight of about 500 to 20,000, a functionality of 0 to 10 and a sulfonate concentration of about 0.1 to 30 percent by weight.

The preparation of sulfonated polybutadiene polyol suitable for the preparation of the inventive foams has been disclosed in U.S. Pat. Application Ser. No. 08/041,116 filed Apr. 1, 1993. Accordingly sulfonic acid groups (sulfonic acid and or sulfonates groups) are incorporated in the structure of an aliphatic, non-polar, water insoluble compound which contains at least 1 mole % unsaturation by (i) dissolving the compound in a water soluble solvent having a boiling temperature in the range of 60° to 250° C. to produce first solution, and (ii) reacting the first solution with an aqueous solution of a sulfonation agent in the presence of a catalyst and oxygen to produce the sulfonated product and (iii) isolating the sulfonated product. Preferably the compound to be sulfonated is based on polybutadiene, most preferably it is polybutadiene polyol. Polybutadiene polyol is generally consisting of a mixture of three isomers, the relative amounts of which in the mixture depends on the method of their preparation; all isomers and their combinations are suitable for the sulfonation process and all thus sulfonated compounds are suitable in the context of the present invention. The product, the sulfonated compound, containing 0.1 to 30 percent by weight of sulfonate groups, is sufficiently polar and thus miscible in polyester polyols or polyester polyols.

In preparing the foams of the present invention, the polyol and additive(s) are mixed and reacted with an organic polyisocyanate in the presence of water and the optional additional blowing agent, a catalyst and a foam stabilizer. In order to prepare "flexible" foams as that term is recognized in the art, it is essential that the hydroxyl number of the mixture of polyol, additive, and any other isocyanate-reactive materials, excluding water, present be from 25 to 300, preferably from 25 to 200, and most preferably from about 60 to about 160.

Optionally, additional compounds containing at least two isocyanate-reactive hydrogen atoms and having a molecular weight of about 32 to 399 may also be used. Suitable compounds contain hydroxyl groups, amino groups, thiol groups or carboxyl groups, preferably hydroxyl groups and/or amino groups which serve as crosslinking agents or chain extending agents. These compounds generally contain about 2 to about 8 (preferably 2 to 4) isocyanate-reactive hydrogen atoms. Examples of such compounds can be found in German offenlegungsschrift 2,832,253, pages 10 to 20, sorbitol is a suitable crosslinking compound.

Suitable blowing agents include water, optionally, with additional readily volatile inorganic or organic substances in an amount of 0.1 to 25 parts by weight to 100 parts by weight of polyol. Appropriate additional organic blowing agents are acetone, ethyl acetate, halogen-substituted alkanes, such as methylene chloride, chloroform, ethylidene chloride, vinylidene chloride, monofluorotrichloromethane; chlorodifluoromethane, dichlorodifluoromethane; cyclopentane, fluorinated hydrocarbons, butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g., nitrogen, given off by azo compounds, such as azodicarbonamide or azobutyronitrile). Other examples of blowing agents and information on the use of blowing agents may be found in Kunststoff-Handbuch, Vol. VII, by Vieweg and Hochtlen, Carl-Hanser-Verlag, Munich, 1966, for example, on pages 108 and 109, 453 to 455 and 507 to 510.

Catalysts known in the art are also used in the practice of the present invention. Among these catalysts are tertiary amines such as triethylamine; tributylamine; N-methyl morpholine; morpholine; N,N,N',N'-tetramethyl ethylene diamine; pentamethyl diethylene triamine and higher homologues (German Offenlegungsschriften Nos. 2,624,527 and 2,624,528); 1,4-diazabicyclo-(2,2,2)-octane; N-methyl-N'-dimethylamino-methyl piperidine; bis(dimethylaminoalkyl)-piperazines (German Offenlegungsschrift No. 2,636,787); N,N-dimethyl benzylamine; N,N-dimethyl cyclohexylamine; N,N-diethyl benzylamine; bis(N,N-diethylaminoethyl)-adipate; N,N,N',N'-tetramethyl-1,3-butane diamine; N,N-dimethylphenylethylamine; 1,2-dimethylimidazole; 2-methyl imidazole; monocyclic and bicyclic amidines (German Offenlegungsschrift No. 1,720,633); bis-(dialkylamino)-alkyl ethers (U.S. Pat. No. 3,330,782, German Auslegeschrift No. 1,030,558, German Offenlegungsschriften Nos. 1,804,361 and 2,618,280); tertiary amines containing amide groups (preferably, formamide groups) according to German Offenlegungsschriften Nos. 2,523,633 and 2,732,292. Other suitable catalysts are also Mannich bases of secondary amines (such as dimethylamine), aldehydes (preferably, formaldehyde), ketones (such as; acetone, methylethyl ketone and cyclohexanone) and phenols (such as; phenol, nonyl phenol or bisphenol).

Tertiary amines containing isocyanate-reactive hydrogen atoms suitable for use as catalysts are triethanolamine, triisopropanolamine, N-methyldiethanolamine, N-ethyldiethanolamine, N,N-dimethylethanolamine, the reaction products thereof with alkylene oxides (such as, propylene oxide and/or ethylene oxide), and also secondary-tertiary amines according to German Offenlegungsschrift No. 2,732,292.

Other suitable addition catalysts are silaamines containing carbon-silicon bonds of the type described in German Pat. No. 1,229,290 (corresponds to U.S. Pat. No. 3,620,984). Examples of these compounds are: 2,2,4-trimethyl-2-silamorpholine and 1,3-diethylaminomethyl tetramethyl disiloxane.

Other catalysts which may be used in the present invention include: nitrogen-containing bases (such as, tetraalkyl ammonium hydroxides), alkali metal hydroxides (such as, sodium hydroxide), alkali metal phenolates (such as, sodium phenolate) and alkali metal alcoholates (such as, sodium methylate). Hexahydrotriazines may also be used as catalysts (German Offenlegungsschrift No. 1,769,043).

The reaction between NCO-groups and Zerewitinoff-active hydrogen atoms may also be greatly accelerated by use of lactams and azalactams which are believed to form a complex with the compound containing acid hydrogen. Such complexes and their catalytic effect are described in German Offenlegungsschrift Nos. 2,062,288; 2,062,289; 2,117,576 (U.S. Pat. No. 3,758,442); 2,129,198; 2,330,175 and 2,330,211.

Organo-tin compounds must not be used as catalyst in the present invention.

Additional catalysts which may be used in accordance with the present invention may be found in Kunstsoff-Handbuch by Vieweg and Hochtlen, Vol. VII, Carl-Hanser-Verlag, Munich, 1966, for example, on pages 96 to 102. The additional catalysts are generally used in a quantity of from about 0.001 to 10% by weight, (based on the total quantity of compounds containing at least two isocyanate-reactive hydrogen atoms).

Suitable foam stabilizers include polyether siloxanes, particularly water-soluble types. The structure of these compounds is generally such a that a copolymer of ethylene oxide and propylene oxide is attached to a polymethyl siloxane residue. Such foam stabilizers are described in U.S. Pat. Nos. 2,834,748; 2,917,480 and 3,629,308. In many cases, polysiloxanepolyoxyalkylene copolymers branched through allophanate groups (German Offenlegungsschrift No. 2,558,523) are particularly advantageous.

Reaction retarders (e.g., acid-reacting substances, such as, hydrochloric acid or organic acid halides), cell regulators (such as paraffins or fatty alcohols or dimethyl polysiloxanes), pigments, dyes, known flame-proofing agents (for example, trischloroethyl phosphate, tricresyl phosphate or ammonium phosphate and polyphosphate), stabilizers against the effects of ageing and weather, plasticizers, fungistatic and bacteriostatic substances, and fillers (such as, barium sulphate, kieselguhr, carbon black or whiting) may also be used in the practice of the present invention.

Additional examples of surface-active additives, foam stabilizers, cell regulators, reaction retarders, stabilizers, flame-proofing agents, plasticizers, dyes, fillers, fungistatic and bacteriostatic substances which may optionally be used in the present invention and information on the way in which these additives may be used may be found in Kunststoff-Handbuch, Vol. VII, by Vieweg and Hochtlen, Carl-Henser-Verlag, Munich, 1966, for example, on pages 103 to 113.

The process of the present invention may be carried out by techniques well known to those in the art. These known methods include reacting the starting materials by the one-shot process. Suitable apparatuses are described in U.S. Pat. No. 2,764,565. Particulars of processing machines may also be found in Kunststoff Handbuch by Vieweg and Hochtlen, Vol. VII, Carl-Hanser-Verlag, Munich, 1966, for example on pages 121 to 205.

The isocyanate index used to produce the foams of the present invention can be varied over a wide range and generally is from about 80 to 115, preferably from 90 to 105.

Foams may be made in accordance with the present invention by introducing the foamable reaction mixture into a close mold. Suitable mold materials are metals (for example, aluminum) or plastics (for example, epoxide resin). The foamable reaction mixture foams in the mold and forms the molding. In-mold foaming may be carried out in such a way that the molding has either a cellular structure at its surface, or a compact skin and a cellular core. The foamable reaction mixture may be introduced into the mold in such a quantity that the foam formed just fills the mold. However, it is also possible to introduce more foamable reaction mixture than is required to fill the interior of the mold with foam. This latter technique is known as "overcharging" and is described in U.S. Pat. Nos. 3,178,490 and 3,182,104. In many cases, known "external release agents" (such as, silicone oils) are used for in-mold foaming. However, it is also possible to use so-called "internal release agents", optionally in admixture with external release agents, of the type described in German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086). Foams may also be produced by block foaming.

The components described above may be employed to produce soft, flexible polyurethane foam. The polyol composition comprising polyol and the sulfonated polybutadiene is reacted with an appropriate amount of organic polyisocyanate in the presence of catalysts, and surfactants optionally with any of a variety of additives or fillers, and when desired additional blowing agents.

The foams may be made in a one-step process which entails reacting all the ingredients together at once or by the "quasi prepolymer method". In the one shot process, where foaming is carried out in machines, the active hydrogen-containing products, catalysts, surfactants, blowing agents and optional additives may be introduced through separate pipes to the mixing head where they are combined with the polyisocyanate to yield the polyurethane-forming mixture. The mixture may be poured or injected into a suitable container or mold as required. For use in a machine with a limited number of component lines into the mixing head, a pre-mix of all the components except the polyisocyanate (and supplementary blowing agent when a gas is used) to produce a polyol formulation, may advantageously be employed. This procedure simplifies the metering and mixing of the reacting components at the time the polyurethane-forming mixture is prepared.

The sulfonated polybutadiene polyol of the invention may be metered separately, diluted with polyols or with other known diluents.

Alternatively, the foams may be prepared by the so-called quasi-prepolymer method",. In accordance with this method, a portion of the polyol component is reacted in the absence of catalysts with the polyisocyanate component in proportions so as to provide from about 10 to 30 percent of free isocyanate groups in the reaction product based on the weight of the prepolymer. To prepare foam, the remaining portion of the polyol is added and the components are allowed to react together in the presence of catalysts and other appropriate additives, such as, blowing agents, surfactants, etc. Other additives may be added to either the prepolymer or remaining polyol or both prior to the mixing of the components, whereby, at the end of the reaction a flexible polurethane foam is provided.

The soft, flexible foam of the invention is characterized by (i) having an hardness, IFD 25% value, of at most 29 lbs/50 in$^2$, as determined in accordance with Test B$_1$ of ASTM D 3574 and (ii) a density of about 0.9 to 3.0, preferably 1.2 to 2.5, pounds per cubic foot. The foams exhibit properties which are equivalent to or better than comparative foams prepared using environmentally harmful blowing agents.

Machinery useful in carrying out the process thus described has been disclosed in U.S. Pat. No. 2,764,565 which is incorporated herein by reference. Additional information in this regard may be found in the cited Kunststoff Handbuch at pages 121-205.

The foams produced in accordance with the invention may be used in the manufacture of seating, mattresses, packaging materials, films for laminating purposes, insulating media and in upholstery as fillings in cushions and in quilts.

The following examples further illustrate details of the invention. The invention which is set forth in the foregoing disclosure is not to be limited in spirit or scope by these examples. The art-skilled would readily understand the variations of the conditions of the following procedures. Unless otherwise notes, all temperatures are in centigrade and percentages are percentages by weight.

EXAMPLES

The following describes the preparation of a soft, flexible foam in accordance with the present invention.

The foams were produced using a Hennecke UBT machine which essentially combines the metered streams of several components into a mixing chamber into which the isocyanate component is injected. Each of polyol, water, surfactant and catalyst were thus combined. Naturally, as is well known in the art, combined streams are also possible and are sometimes practical; the addition of the optional compounds (for instance, crosslinking agents (and the blowing agent may be carried out by separate metering as well as by combined metering. Also combination with other raw material, for instance, polyol or with another diluent, are possible. In the present set of experiments, the crosslinking agent was metered separately and the sulfonated polybutadiene was diluted with polyol at a weight ratio of 1:4. In the experiment, except for the polyol, the components were introduced under pressure, although this is not generally required. The processing and curing of the foams were conventional. The foams thus produced were deeded to be of acceptable quality.

The table below summarizes the several experiments; the amounts noted are in parts by weight. The polyol used was 3-functional having a molecular weight of 3500; the surfactant and catalyst were conventional commercial products, the crosslinking agent used was conventional. None of the surfactant, catalyst and crosslinking agent are believed to have criticality to the invention.

| Example | 1 | 2 | 3 | 4 | 5 | 6 |
|---|---|---|---|---|---|---|
| polyol | 100 | 100 | 100 | 100 | 100 | 100 |
| water | 4.5 | 4.5 | 3.1 | 3.1 | 5.0 | 5.0 |
| surfactant | 1.0 | 1.0 | 1.0 | 1.0 | 1.3 | 1.3 |
| catalyst | 0.4 | 0.4 | 0.38 | 0.38 | 0.4 | 0.5 |
| sulfonated butadiene | — | 1.0 | — | 1.2 | 1.0 | — |
| cross linking agent | — | — | — | — | 0.7 | — |
| TDI 80 | 53.5 | 53.5 | 39.7 | 39.7 | 54.2 | 54.2 |
| Density (pcf*) | 1.3 | 1.3 | 1.8 | 1.8 | 1.2 | g** |
| ILD (25%) | 28 | 18 | 29 | 19 | 15 | g |

*pounds per cubic foot
**g - unsuitable foam

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible foam prepared by reacting:
   (a) at least one organic polyisocyanate with
   (b) at least one polyol having a molecular weight of about 400 to about 12,000 and a functionality in excess of 2, in the presence of a catalyst and water and a compound conforming to

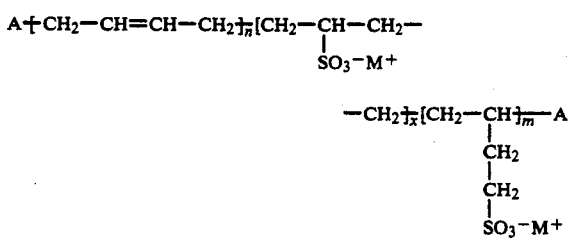

where A is selected from among H, COOH, $HN_2$, and OH, M is selected from the group consisting of $H^{30}$, $LI^+$, $K^+$ and $NR_4^+$, where R is hydrogen or an alkyl group, and where n, x and m are selected such that said compound has a number average molecular weight of about 500 to 20,000, a functionality of 0 to 10 and a sulfonate concentration of about 0.1 to 30 percent by weight, said foam being characterized in having (i) a hardness, IFD 25% value, of at most 29 lbs/50 in$^2$, as determined in accordance with Test $B_1$ of ASTM D 3574 and (ii) a density of about 0.9 to 3.0 pounds per cubic foot.

2. The foam of claim 1 wherein said polyol has a molecular weight of about 1,000 to about 8,000.

3. The foam of claim 1 wherein said polyol has a molecular weight of about 1,500 to about 7,000.

4. The foam of claim 2 wherein polyol has an average functionality of from 2.5 to no more than 4.

5. The foam of claim 4 having a density of about 1.2 to 2.5 pounds per cubic foot.

* * * * *